United States Patent
Furuki et al.

(10) Patent No.: US 7,081,929 B2
(45) Date of Patent: Jul. 25, 2006

(54) LIQUID CRYSTAL SHUTTER PANEL, AN OPTICAL PRINTER HEAD AND A METHOD FOR MANUFACTURING THE LIQUID CRYSTAL SHUTTER PANEL

(75) Inventors: Ichiro Furuki, Tokyo (JP); Keiki Yamada, Tokyo (JP); Hiroshi Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/357,404

(22) Filed: Feb. 4, 2003

(65) Prior Publication Data

US 2003/0147028 A1    Aug. 7, 2003

(30) Foreign Application Priority Data

Feb. 5, 2002    (JP)    ............... 2002-027519

(51) Int. Cl.
*G02F 1/1335*    (2006.01)
(52) U.S. Cl. .................. 349/3; 349/111; 349/139; 349/187
(58) Field of Classification Search .............. 349/2, 349/3, 139, 110, 111, 187, 61, 96, 193, 67
See application file for complete search history.

(56) References Cited

U.S. PATENT DOCUMENTS

| | | | | |
|---|---|---|---|---|
| 4,838,657 A | * | 6/1989 | Miura et al. | 349/111 |
| 4,884,079 A | * | 11/1989 | Inoue et al. | 347/247 |
| 5,312,643 A | * | 5/1994 | Yamamoto et al. | 427/108 |
| 5,777,776 A | * | 7/1998 | Hiraga et al. | 359/244 |
| 6,141,065 A | | 10/2000 | Furuki et al. | |
| 6,168,825 B1 | * | 1/2001 | O'Brien et al. | 427/160 |
| 6,281,923 B1 | | 8/2001 | Yamada et al. | |
| 6,414,705 B1 | | 7/2002 | Yamada et al. | |

FOREIGN PATENT DOCUMENTS

| | | | |
|---|---|---|---|
| JP | 60-143315 | * | 7/1985 |
| JP | 62-46658 A | | 2/1987 |
| JP | 5-165057 | | 6/1993 |
| JP | 11-194358 A | | 7/1999 |

OTHER PUBLICATIONS

"Color TFT Liquid Display", published by Kyoritsu Shuppan Co., Ltd. (partial English translation attached).

* cited by examiner

*Primary Examiner*—Toan Ton
*Assistant Examiner*—Tai Duong
(74) *Attorney, Agent, or Firm*—Birch, Stewart, Kolasch & Birch, LLP

(57) ABSTRACT

A blocking mask and an electrode coating are formed using a gold film. The blocking mask and the electrode coating are formed together by printing an organic gold paste only in a necessary part and baking the printed organic gold paste.

10 Claims, 10 Drawing Sheets

1c LOWER GLASS BOARD FRAME PART
2a UPPER ORIENTATION FILM
2b LOWER ORIENTATION FILM
3a COMMON ELECTRODE
3b PIXEL ELECTRODE
3c WIRING PATTERN
4 SEAL MATERIAL
5 LIQUID CRYSTAL
6a BLOCKING MASK OF GOLD FILM
7c GOLD FILM ELECTRODE COATING
8 DRIVE IC
9 CABLE

1c  LOWER GLASS BOARD FRAME PART
2a  UPPER ORIENTATION FILM
2b  LOWER ORIENTATION FILM
3a  COMMON ELECTRODE
3b  PIXEL ELECTRODE
3c  WIRING PATTERN
4   SEAL MATERIAL
5   LIQUID CRYSTAL
6a  BLOCKING MASK OF GOLD FILM
7c  GOLD FILM ELECTRODE COATING
8   DRIVE IC
9   CABLE

Fig. 6

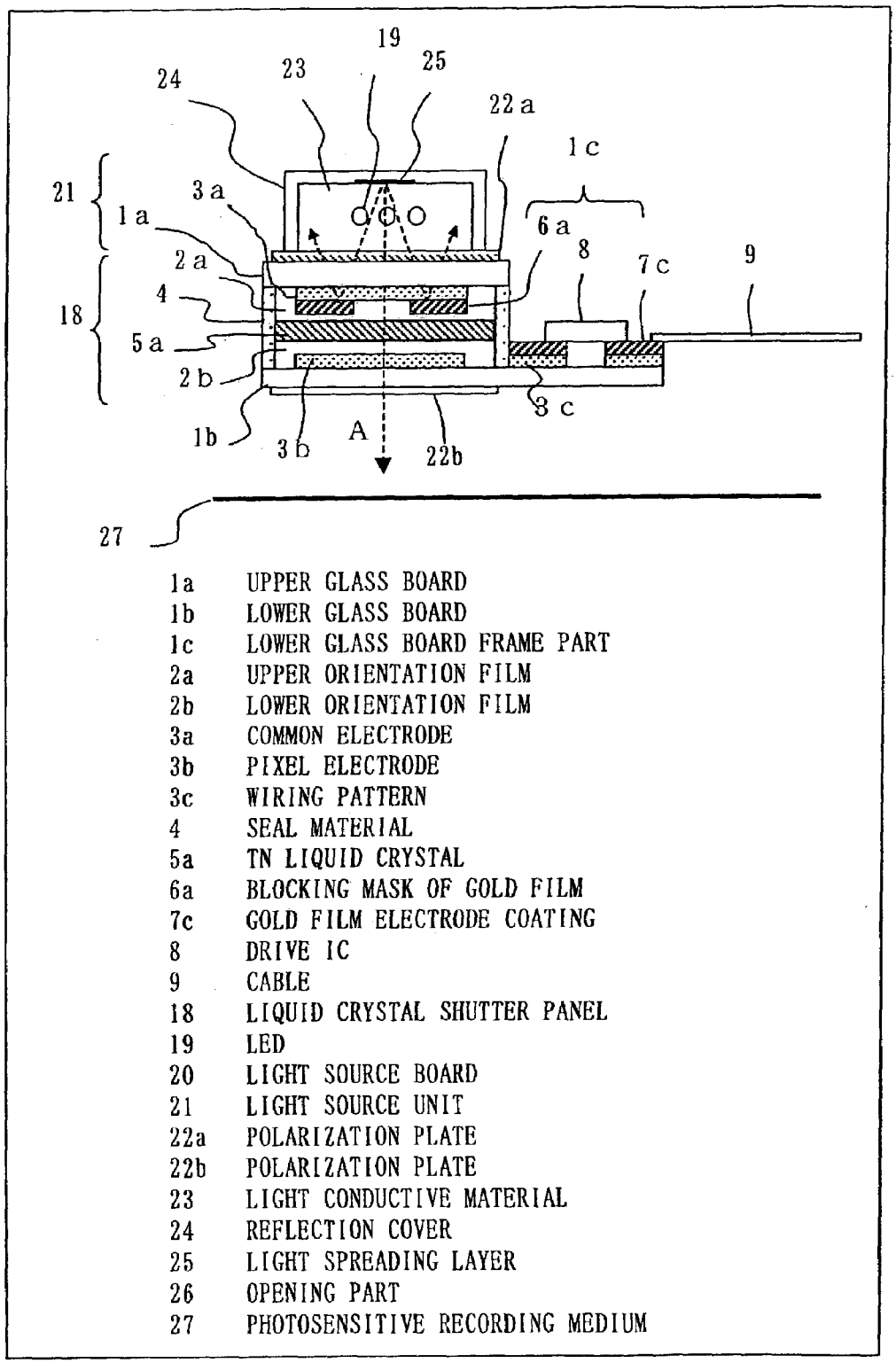

| | |
|---|---|
| 1a | UPPER GLASS BOARD |
| 1b | LOWER GLASS BOARD |
| 1c | LOWER GLASS BOARD FRAME PART |
| 2a | UPPER ORIENTATION FILM |
| 2b | LOWER ORIENTATION FILM |
| 3a | COMMON ELECTRODE |
| 3b | PIXEL ELECTRODE |
| 3c | WIRING PATTERN |
| 4 | SEAL MATERIAL |
| 5a | TN LIQUID CRYSTAL |
| 6a | BLOCKING MASK OF GOLD FILM |
| 7c | GOLD FILM ELECTRODE COATING |
| 8 | DRIVE IC |
| 9 | CABLE |
| 18 | LIQUID CRYSTAL SHUTTER PANEL |
| 19 | LED |
| 20 | LIGHT SOURCE BOARD |
| 21 | LIGHT SOURCE UNIT |
| 22a | POLARIZATION PLATE |
| 22b | POLARIZATION PLATE |
| 23 | LIGHT CONDUCTIVE MATERIAL |
| 24 | REFLECTION COVER |
| 25 | LIGHT SPREADING LAYER |
| 26 | OPENING PART |
| 27 | PHOTOSENSITIVE RECORDING MEDIUM |

1a UPPER GLASS BOARD
1b LOWER GLASS BOARD
1c LOWER GLASS BOARD FRAME PART
2a UPPER ORIENTATION FILM
2b LOWER ORIENTATION FILM
3a COMMON ELECTRODE
3b PIXEL ELECTRODE
3c WIRING PATTERN
4 SEAL MATERIAL
5 LIQUID CRYSTAL
6 BLOCKING MASK
7a METAL ELECTRODE COATING
7b METAL ELECTRODE COATING (NOBLE METAL)
8 DRIVE IC
9 CABLE

10 GLASS BASE BOARD
11 ITO ELECTRODE COATING
12 METAL CHROMIUM FILM
13 METAL FILM
14 PHOTORESIST FILM
15 PHOTOMASK
16 ULTRAVIOLET RAYS

- 3a COMMON ELECTRODE
- 3b PIXEL ELECTRODE
- 3c WIRING PATTERN
- 10 BLOCKING MASK
- 7a, 7b METAL ELECTRODE COATING
- 10 GLASS BASE BOARD
- 14a PHOTORESIST FILM
- 14b PHOTORESIST
- 15a, 15b PHOTOMASK
- 16 ULTRAVIOLET RAYS

LIQUID CRYSTAL SHUTTER PANEL, AN OPTICAL PRINTER HEAD AND A METHOD FOR MANUFACTURING THE LIQUID CRYSTAL SHUTTER PANEL

BACKGROUND OF THE INVENTION

1. Field of the Invention

This invention relates to a liquid crystal shutter panel applied to a display and a printer head and its manufacturing method and an optical printer head using the liquid crystal shutter panel.

2. Description of the Related Art

FIG. 7 shows a sectional view of a general structure of a liquid crystal shutter panel according to the related art, mounted with a drive IC (Integrated Circuit). In the liquid crystal panel, a common electrode 3a made of ITO (Indium Tin Oxide) coated with an upper orientation film 2a and a pixel electrode 3b made of ITO coated with a lower orientation film 2b are formed on facing inner surfaces of an upper glass board 1a and a lower glass board 1b. Liquid crystal 5 is sealed in a cell formed by bonding the upper glass board 1a and the lower glass board 1b by a seal material 4.

A blocking mask 6 for blocking light to an area except a display pixel is formed on the common electrode 3a formed on the upper glass board 1a. In the lower glass board 1b, a lower board frame part 1c projects toward one side. On the lower board frame part 1c, a wiring pattern 3c made of the ITO for connecting the pixel electrode 3b and the common electrode 3a and metal electrode coatings 7a and 7b for lowering an electrode resistance value of the wiring pattern 3c are formed. A drive IC 8 for driving the liquid crystal and a cable 9 for delivering a signal from an outside are joined on the metal electrode coating 7b.

As illustrated in FIG. 8, the upper glass board 1a and the lower glass board 1b are formed on a sheet of a glass base board 10 in the stated liquid crystal shutter panel (a1). The upper orientation film 2a and a lower orientation film 2b are formed on the glass base board 10, and two sheets of glass base boards 10 are bonded by the seal material 4(b1). Then, by separating each of boards, a plurality of liquid crystal shutter panels is formed from two sheets of glass base boards 10(c1).

Generally, chromium metal which highly blocks light is used as a material for the blocking mask 6, and the blocking mask 6 is often formed together with the metal electrode coating 7a. However, a resistance value of the chromium metal is high, and the chromium metal is easily oxidized. Therefore, as illustrated in FIG. 7, a noble metal, e.g., gold, platinum, etc. which has high electrical conductivity and low corrosivity is used as the metal electrode coating 7b on the metal electrode coating 7a made of chromium.

Next, with reference to FIGS. 9 and 10, a method for forming the blocking mask 6 and an electrode pattern of the stated liquid crystal shutter panel is explained.

At first, an ITO electrode film 11 is formed on a whole surface of the glass base board 10 using a vapor-deposition method, sputtering method, etc. (step a0). Next, a metal chromium film 12 is formed on a whole upper surface of the ITO electrode film 11 using the vapor-deposition method, sputtering method, etc. (step b0). Then, a metal film 13 made of the gold or the platinum is formed on a whole upper surface of the metal chromium film 12 using the vapor-deposition method, sputtering method, etc. (step c0).

Next, steps for patterning the metal film 13 using a photo lithography method is explained. A photoresist film 14 of positive type is spin-coated on a whole upper surface of the metal film 13 (step d0). Next, a photomask 15 of positive type in which a wiring pattern image for drive IC is formed is placed to cover the photoresist film 14, and the photoresist film 14 is irradiated with ultraviolet rays 16 through the photomask 15. A wiring pattern of the photomask 15 is not transparent, and rest of the photomask 15 is transparent. A portion on the photoresist film 14, which has been exposed to the ultraviolet rays 16 through the photomask 15 becomes dissolvable in a developer, and removed (step e0). Next, the glass base board after processing the photoresist film 14 is soaked in an etchant for metal, and a portion of the metal film 13 exposed to a surface is etched (step f0). The photoresist film 14 remaining on the surface of the metal film 13 is stripped (step g0).

Next, like the above method, a photoresist film 14a of positive type is spin-coated on the whole surface of the glass base board 10 (step h0). Then, a photomask 15a in which a wiring pattern and a blocking mask shape are formed is placed on the glass base board 10 by positioning to match with the wiring pattern which was formed earlier, and the photoresist film 14 is irradiated with the ultraviolet rays 16 through the photomask 15a. A portion of the photoresist film 14a irradiated with the ultraviolet rays 16 through the photomask 15a becomes dissolvable in the developer, and removed (FIG. 10, step i0). Next, the glass base board 10 is soaked in the etchant for chromium, and a portion of the metal chromium film 12 exposed to a surface is etched (step j0). The photoresist film 14a remaining on the surface of the glass base board 10 is stripped (step k0).

Next, like the above method, a photoresist film 14b of positive type is spin-coated on the whole surface of the glass base board 10 (step l0). Then, a photomask 15b in which an ITO wiring pattern is formed is placed to cover the glass base board 10 by positioning to match with the wiring pattern which was formed earlier, and the glass base board 10 is irradiated with the ultraviolet rays 16 through the photomask 15b. A portion of the photoresist film 14b irradiated with the ultraviolet rays 16 through the photomask 15b becomes dissolvable in the developer, and removed (step m0). Next, the glass base board 10 is soaked in the etchant for ITO, and a portion of the ITO electrode film 11 exposed to a surface is etched (step n0). The photoresist film 14b remaining on the surface of the glass base board 10 is stripped (step o0). After these steps, the common electrode 3a, the pixel electrode 3b, the wiring pattern 3c, the metal electrode coatings 7a and 7b and the blocking mask 6 are formed on the glass base board 10.

In a method for forming the blocking mask and the electrode pattern according to the related art, the metal film 13 is formed on the whole surface of the glass base board 10. Therefore, a large area of the metal film 13 which is unnecessary is removed, and the metal film 13 made of the gold, platinum, etc. which is expensive is wasted. Further, in the method for forming the blocking mask and the electrode pattern according to the related art, a number of steps in manufacturing increases, e.g., the photomask must be used three times, etc. Consequently, there is a problem that manufacturing costs become high.

SUMMARY OF THE INVENTION

According to an aspect of this invention, a liquid crystal shutter panel including a plurality of pixels for one of transmitting and blocking light based on an input signal from an outside includes liquid crystal driven based on the input signal and a blocking mask for preventing leakage of light from an area except the pixels. The blocking mask is formed using a gold film.

According to another aspect of this invention, a liquid crystal shutter panel includes a pixel electrode board which transmits light, on a surface of which a pixel electrode to which an image data signal is supplied is formed and a common electrode board made of a same material with the pixel electrode board, arranged to be parallel with the pixel electrode board, on a surface of which, facing the pixel electrode, a common electrode is formed. The liquid crystal shutter panel also includes a blocking mask formed on the common electrode, including an opening part for transmitting light which has been transmitted by one of the pixel electrode board and the common electrode board and is emitted toward the other one of them and liquid crystal arranged between the pixel electrode and the blocking mask, which is driven based on the image data signal. The blocking mask is formed using a gold film.

According to another aspect of this invention, the liquid crystal shutter panel further includes a wiring pattern formed on the pixel electrode board, for connecting the pixel electrode and the common electrode and an electrode coating made of the gold film, which is formed on the wiring pattern.

According to another aspect of this invention, in the liquid crystal shutter panel, the pixel electrode, the common electrode, and the wiring pattern are formed using a same material.

According to another aspect of this invention, in the liquid crystal shutter panel, a thickness of the gold film for forming the blocking mask is 0.28 micrometer or more.

According to another aspect of this invention, an optical printer head includes the liquid crystal shutter panel and a light source unit. The light source unit includes a light source and an opening for shooting light and irradiates the liquid crystal shutter with light emitted from the light source through the opening for shooting light.

According to another aspect of this invention, in the optical printer head, the light source unit further includes a light reflecting mechanism for reflecting the light emitted from the light source and light entered the light source unit through the opening for shooting light.

According to another aspect of this invention, in the optical printer head, the light source unit is arranged on a side of the common electrode board of the liquid crystal shutter panel.

According to another aspect of this invention, a method for manufacturing the liquid crystal shutter panel includes base material producing for forming an electrode base material including an area of the pixel electrode, an area of the common electrode and an area of the wiring pattern on one of surfaces of an electrode board material which is a material of the pixel electrode board and the common electrode board, gold film producing for forming the blocking mask using the gold film at a position corresponding to the common electrode on the electrode base material and the electrode coating using the gold film at a position corresponding to the wiring pattern on the electrode base material together and electrode forming for forming the pixel electrode, the common electrode and the wiring pattern by removing an area except areas corresponding to the pixel electrode, common electrode, and wiring pattern from the electrode base material.

According to another aspect of this invention, the method for manufacturing the liquid crystal shutter panel further includes producing a cell by combining the common electrode board and the pixel electrode board by a seal material so that the common electrode and the pixel electrode face each other after the electrode forming.

According to another aspect of this invention, in the method for manufacturing the liquid crystal shutter panel, an organic gold paste is printed at a position corresponding to the common electrode and a position corresponding to the wiring pattern on the electrode base material. The gold film is produced by baking the organic gold paste printed, and the blocking mask and the electrode coating are formed using the gold film in the gold film producing.

According to another aspect of this invention, in the method for manufacturing the liquid crystal shutter panel, a thickness of the gold film of the blocking mask produced in the gold film producing is 0.28 micrometer or more.

The organic gold paste is a known material, e.g., "Metal Organic Paste A-4615 manufactured by Engelhard Corporation" illustrated as an example in Japanese Patent Laid-Open HEI 7-14647. The organic gold paste is also simply called organic gold. It is possible to produce the gold film by printing and baking the organic gold paste.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 6 shows a sectional view of a printer head in Embodiment 3 of this invention;

DETAILED DESCRIPTION OF THE PREFERRED EMBODIMENTS

Embodiment 1

Figure 1:
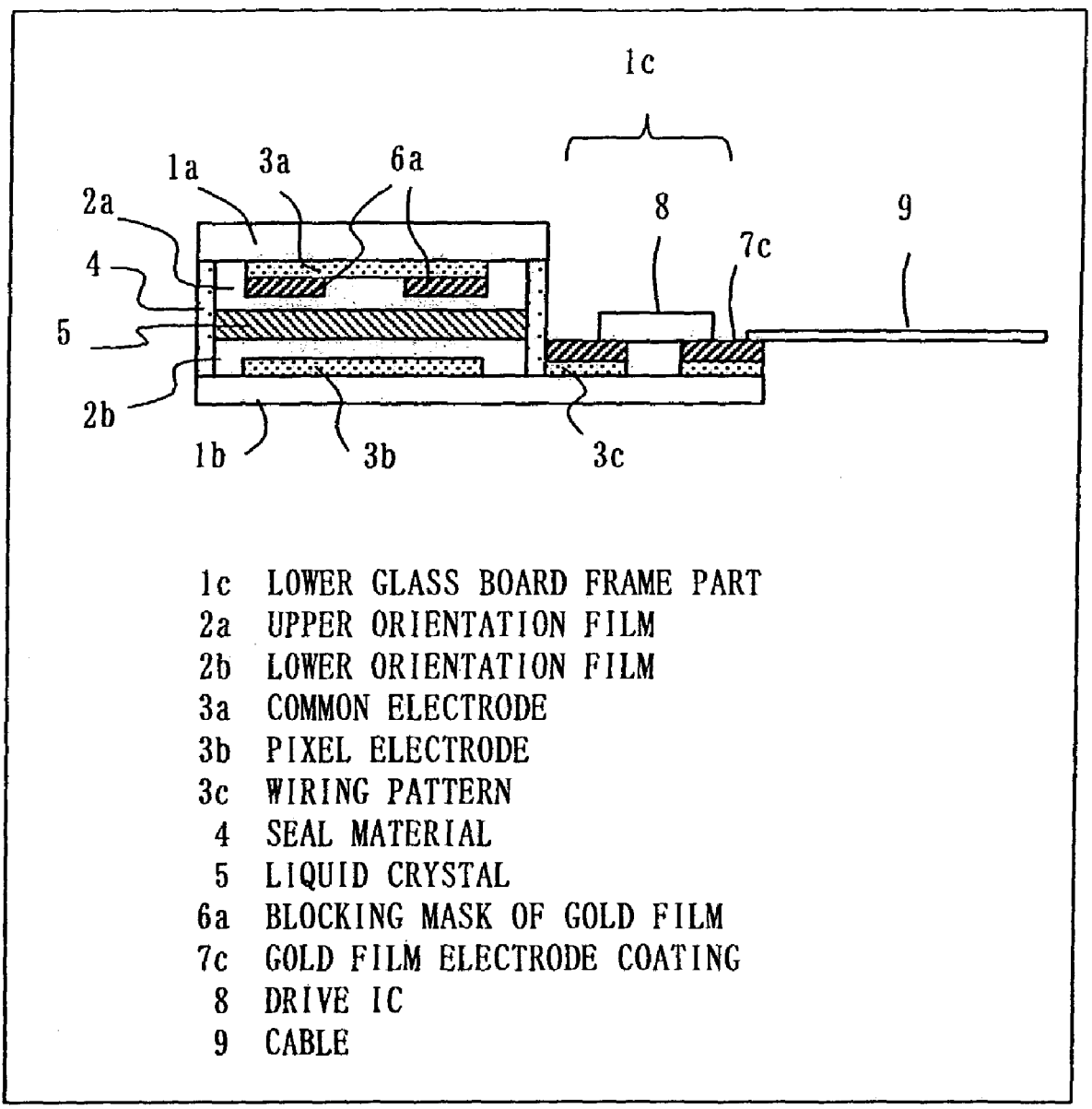
FIG. 1 shows a sectional view of a structure of a liquid crystal shutter panel in Embodiment 1 of this invention.

FIG. 1 shows a sectional view of a structure of a liquid crystal shutter panel using COG (Chip On Glass) method, mounted with a drive IC in Embodiment 1 of this invention.

In FIG. 1, the common electrode 3a made of ITO (Indium Tin Oxide) and a blocking mask of gold film 6a made of gold film are formed on the upper glass board 1a. The pixel electrode 3b is formed on the lower glass board 1b. The upper orientation film 2a and the lower orientation film 2b are also illustrated. The liquid crystal 5 is sealed in a cell formed by bonding the upper glass board 1a and the lower glass board 1b.

An image data signal (input signal) is input to the pixel electrode 3b, and the liquid crystal 5 is driven based on the image data signal.

The lower board frame part 1c for mounting the drive IC 8 for driving the liquid crystal and joining the cable 9 for signal projects toward one side from the lower glass board 1b. The wiring pattern 3c made of ITO for connecting the common electrode 3a and the pixel electrode 3b is formed on the lower board frame part 1c, and a gold film electrode coating 7c made of gold film is formed on the wiring pattern 3c for further lowering the resistance value as the electrode.

The common electrode 3a and the pixel electrode 3b are structured to transmit the light.

Figure 2:
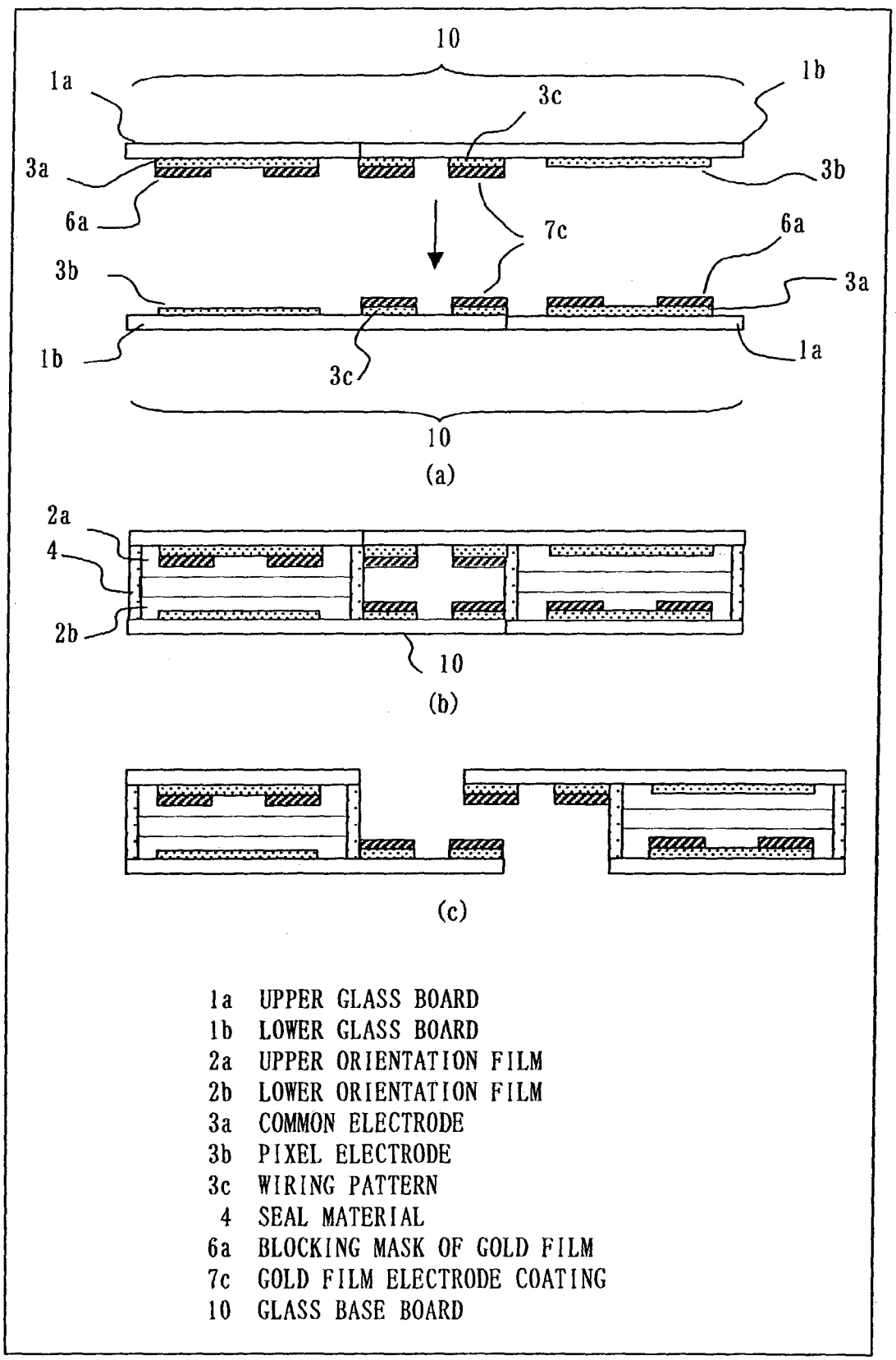
FIG. 2 shows a diagram for explaining steps for forming the liquid crystal shutter panel in Embodiment 1 of this invention.

As illustrated in FIG. 2, the upper glass board 1a and the lower glass board 1b are formed on a sheet of the glass base board 10 in the liquid crystal shutter panel (a). The common electrode 3a and the blocking mask of gold film 6a are formed on the upper glass board 1a, and the pixel electrode 3b, the wiring pattern 3c and the gold film electrode coating 7c are formed on the lower glass board 1b.

The upper orientation film 2a and the lower orientation film 2b are formed on the glass base board 10, and two sheets of the glass base boards 10 are bonded by the seal material 4(b). By separating each of boards, a plurality of liquid crystal shutter panels is formed out of two sheets of glass base boards 10(c).

The upper glass board 1a is a common electrode board in this invention. Similarly, the lower glass board 1b is a pixel electrode board, and the blocking mask of gold film 6a is a blocking mask. The gold film electrode coating 7c is an electrode coating, and the glass base board 10 is an electrode board material.

Figure 3:
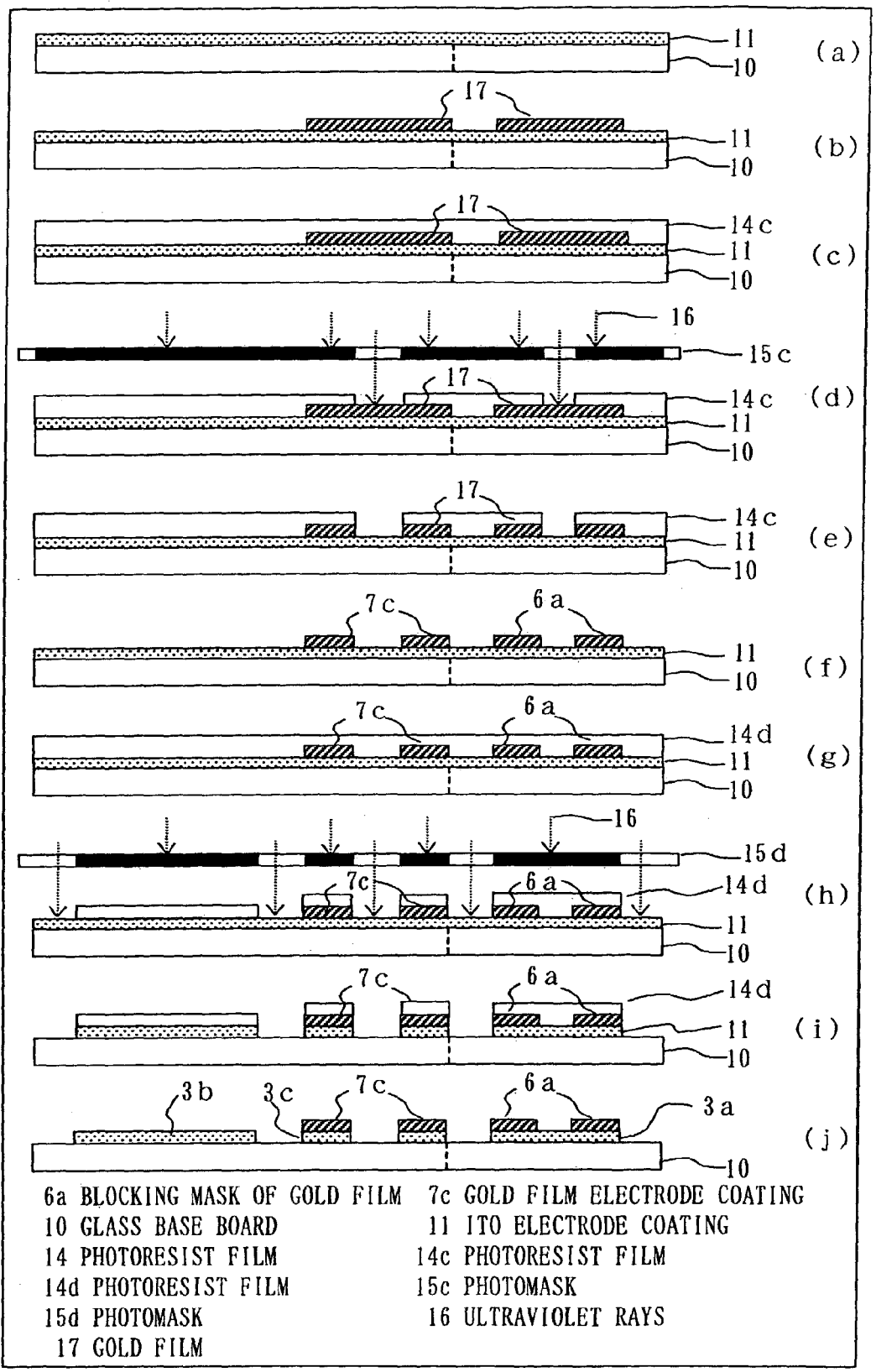
FIG. 3 illustrates a method for forming a blocking mask and an electrode pattern of the liquid crystal shutter panel in Embodiment 1 of this invention.
Figure 4:
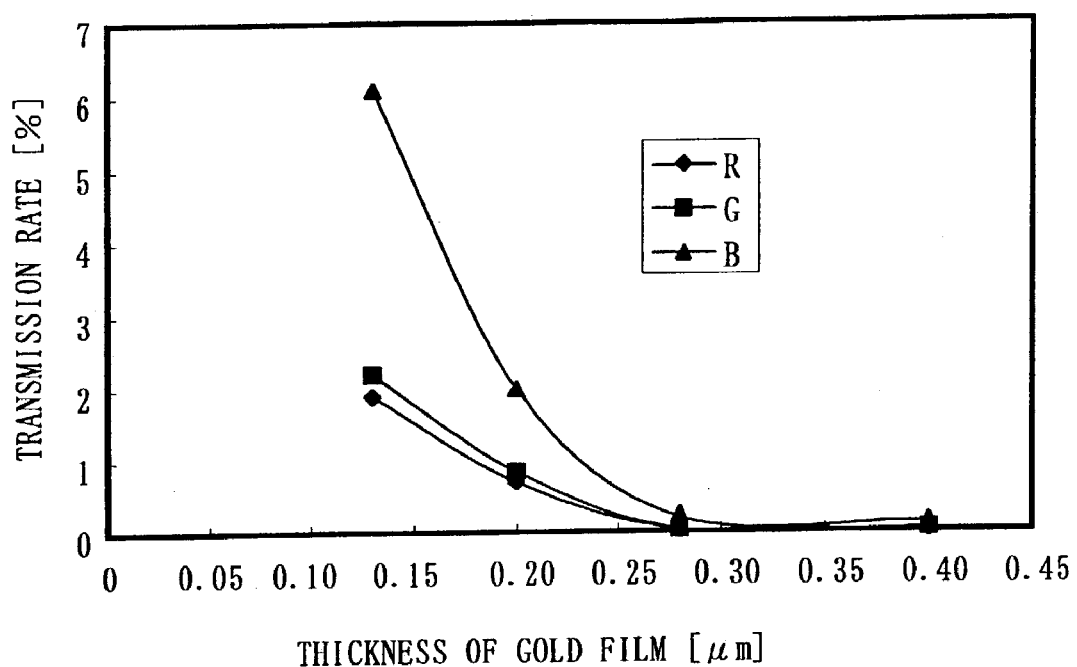
FIG. 4 shows a graph of a thickness of a gold film of the blocking mask vs. transmission rate of light in a liquid crystal shutter panel in Embodiment 2 of this invention.

Next, with reference to FIGS. 3 and 4, a method for forming the blocking mask of gold film 6a and the electrode pattern in the liquid crystal shutter panel in Embodiment 1 is explained.

At first, the ITO electrode film 11 is formed on the whole surface of the glass base board 10 using the vapor-deposition method, sputtering method, etc. (step a).

Next, an organic gold print film is formed on the upper surface of the ITO electrode film 11 by printing organic gold paste (not illustrated) on a portion which is necessary for forming the blocking mask of gold film 6a and the gold film electrode coating 7c illustrated in FIG. 1 using a printing method. Then, a gold film 17 is formed by baking the organic gold print film after drying (step b). In this case, a temperature for baking the organic gold print film is at or below a softening point of glass, and a maximum temperature is around 600 centigrade.

Next, a photoresist film 14c of positive type is screen-printed on a whole surface of the glass base board 10 in which the ITO electrode film 11 and the gold film 17 are formed (step c). The photoresist film 14c is decomposed by irradiation of light. The decomposed portion becomes dissolvable in the developer. It is a sensitized material which is removed at a time of developing.

Next, a photomask 15c of positive type in which a wiring pattern image for drive IC and a blocking mask image are formed is placed to cover the photoresist film 14c, and the photoresist film 14c is irradiated with the ultraviolet rays 16 from an upper surface of the photomask 15c. An area of a wiring pattern and a blocking mask in the photomask 15c is not transparent, and rest of the photomask 15c is transparent. A portion on the photoresist film 14c which has been exposed to the ultraviolet rays 16 through the photomask 15c becomes dissolvable in the developer, and removed (step d).

Next, the glass base board 10 after processing the photoresist film 14c is soaked in the etchant for metal, and a portion of the gold film 17 exposed to a surface is etched (step e). The photoresist film 14c remaining on the surface of the gold film 17 is stripped, and the blocking mask of gold film 6a and the gold film electrode coating 7c are formed (step f).

Next, a photoresist film 14d of positive type is screen-printed on the whole upper surface of the glass base board 10 in which the blocking mask of gold film 6a and the gold film electrode coating 7c are formed (step g). Then, a photomask 15d of positive type in which the wiring pattern image and a common electrode image for drive IC and a pixel electrode image are formed is placed to cover the photoresist film 14d, and the photoresist film 14 is irradiated with the ultraviolet rays 16 from an upper surface of the photomask 15d.

In the photomask 15d, a wiring pattern portion, a common electrode portion and a pixel electrode portion are not transparent, and other area is transparent. A portion on the photoresist film 14d which has been exposed to the ultraviolet rays 16 through the photomask 15d becomes dissolvable in the developer, and removed (step h).

Next, the glass base board 10 after processing the photoresist film 14d is soaked in the etchant for ITO, and a portion of the ITO electrode film 11 exposed to a surface is etched (step i). The photoresist film 14d remaining on the glass base board 10 is stripped, and the wiring pattern 3c, the common electrode 3a and the pixel electrode 3b are formed. Accordingly, the steps for manufacturing the electrode pattern and the blocking mask are ended (step j).

In each of steps in FIG. 3, step a is a step for producing a base material in this invention, steps b–f are steps for producing the gold film, and steps g–j are steps for forming the electrode.

In FIG. 2, (a) illustrates the steps till completing forming the electrode. In the steps of (b) and (c) in FIG. 2, steps for forming a cell in this invention are realized.

As stated, the blocking mask and the electrode coatings are formed together using the organic gold paste. Therefore, steps for manufacturing the liquid crystal shutter panel can be simplified, and manufacturing costs can be reduced.

Further, since the blocking mask and the electrode coatings are partially printed using a gold film paste, the blocking mask and the electrode coatings are formed only in a necessary area. Hence, expensive metal material is not wasted, and manufacturing costs can be reduced.

In this embodiment, the blocking mask, the electrode coatings, and the ITO electrode are formed using the photoresist film of positive type and the photomask of positive type. It is also possible to use a photoresist film of negative type and a photomask of negative type.

In this embodiment, an explanation has been made on a panel of COG type in which the drive IC is mounted on a glass board. However, it is also possible to apply this invention to panels of other types than COG type, e.g., a liquid crystal shutter panel of COF (Chip on Film) type in which the drive IC is mounted on a flexible cable and a panel of TAB (Tape Automated Bonding) type.

Embodiment 2

With reference to FIG. 4, Embodiment 2 is explained.

FIG. 4 is a graph showing a thickness of the blocking mask of gold film 6a vs. transmission rate of light obtained by experiments. In FIG. 4, red light R (center wavelength 650 nm), green light G (center wavelength 550 nm), and blue light B (center wavelength 470 nm) are shown. The transmission rate at which the blocking mask of gold film 6a (excluding an opening part) transmits light of a respective wavelength is shown. As shown in FIG. 4, when the thickness of the gold film is 0.28 μm or more, the transmission rate is 0.2% or less in a whole wavelength range, and it is possible to suppress leakage of light from the blocking mask of gold film 6a. As a method for increasing the thickness of the blocking mask of gold film 6a, there is a method of laying the organic gold paste more than two times in step b of FIG. 3. Since other steps are same as Embodiment 1, explanations are omitted here.

As stated, by forming the blocking mask of gold film 6a in the thickness of 0.28 micrometer (μm) or more, it is possible to suppress the leakage of the light from the blocking mask of gold film 6a for the whole wavelength range (470–650 nm). Therefore, sufficient blocking effect can be secured, and good contrast as the liquid crystal shutter panel for display can be obtained. Further, by suppressing the leakage of the light from the blocking mask of gold film 6a, it can be used as an optical printer head which has stricter restriction against the leakage of the light than the liquid crystal shutter panel for display.

Further, by increasing the thickness of the gold film electrode coating 7c formed together with the blocking mask of gold film 6a, there is an effect of strengthening (lowering) a resistance value of the wiring pattern 3c made of ITO.

Further, the leakage of the light from the area except a pixel can be prevented by specifying the thickness of the film made of metal material used for the blocking mask in the liquid crystal shutter in Embodiment 2.

Embodiment 3

Figure 5A:
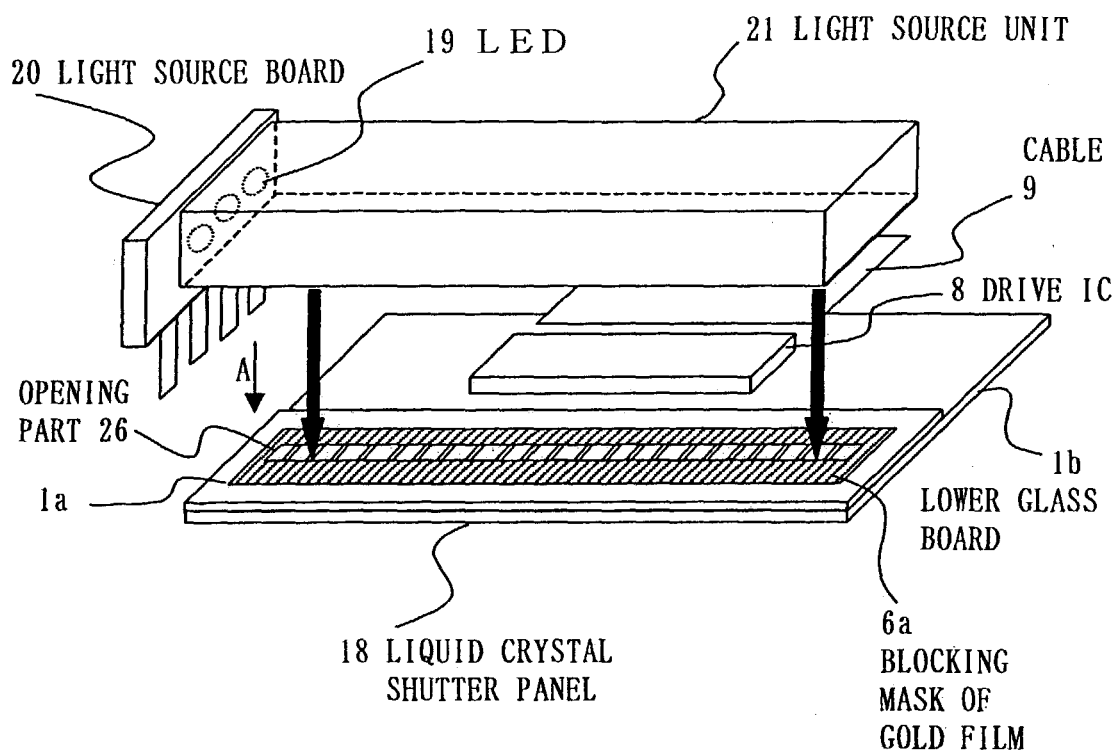
FIG. 5A shows a perspective view of a disassembled structure of a printer head in Embodiment 3 of this invention.
Figure 5B:
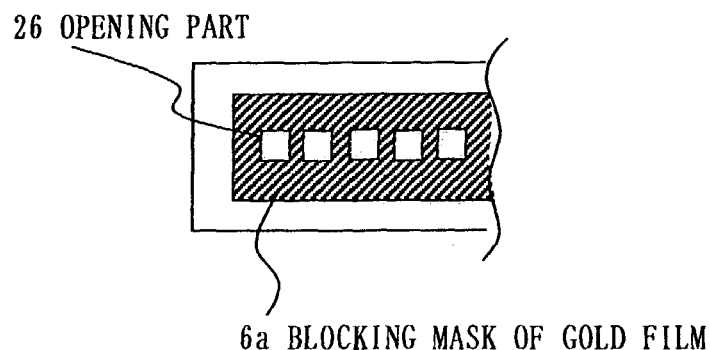
FIG. 5B shows a partially enlarged view of the blocking mask and an opening part of the liquid crystal shutter panel in Embodiment 3 of this invention.
Figure 7:
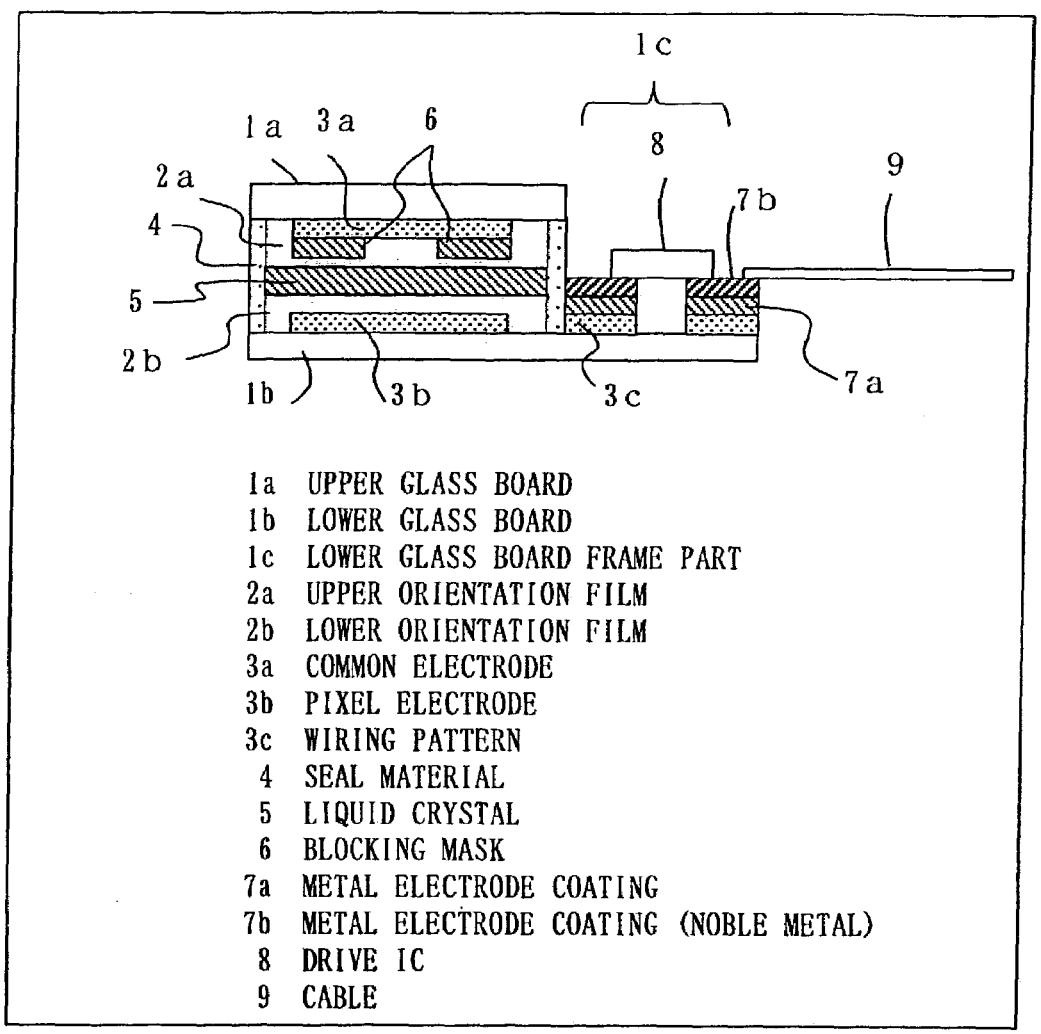
FIG. 7 shows a sectional view of a structure of a liquid crystal shutter panel according to the related art.
Figure 8:
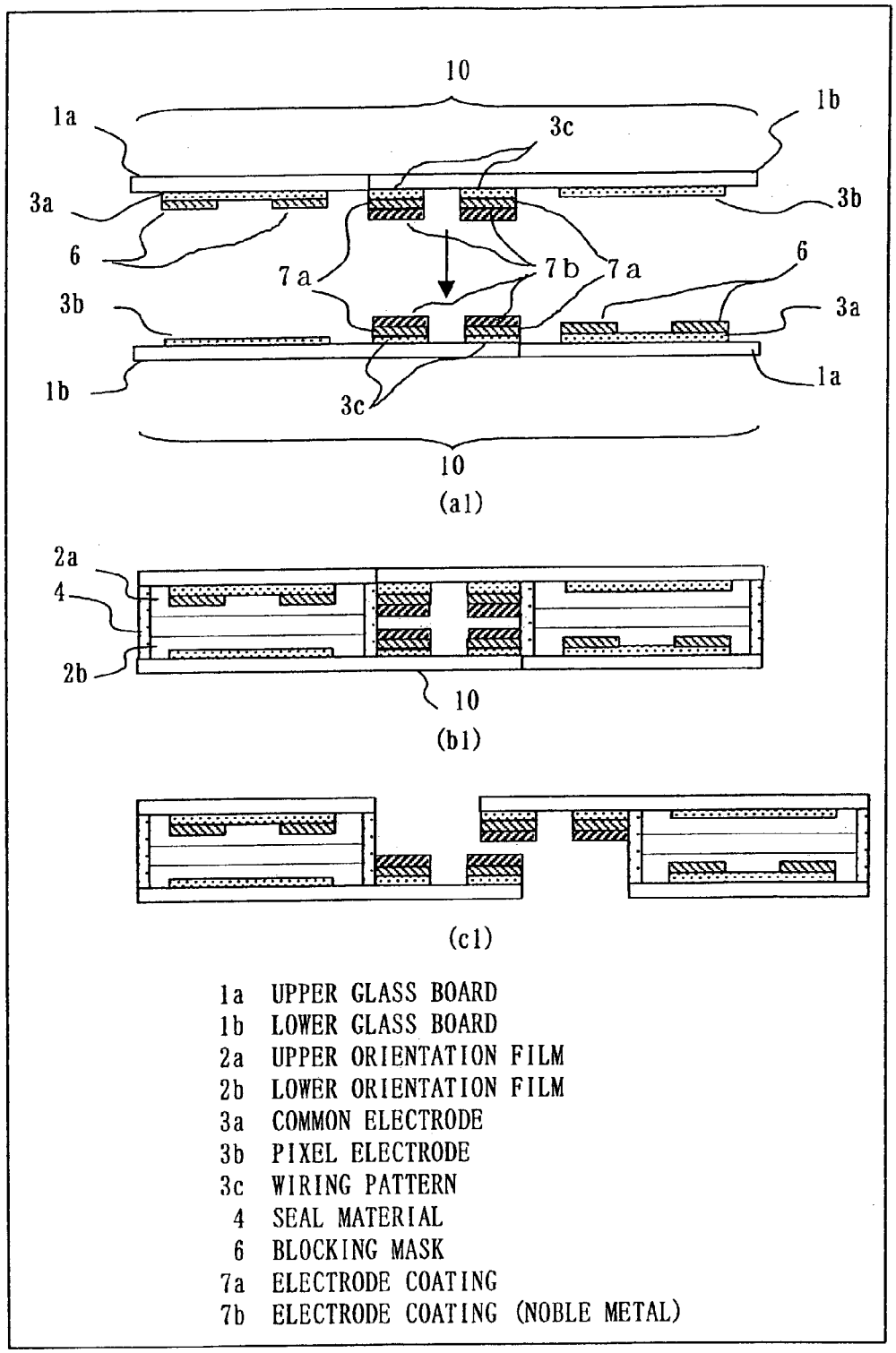
FIG. 8 shows an explanatory diagram of steps for forming the liquid crystal shutter panel according to the related art.
Figure 9:
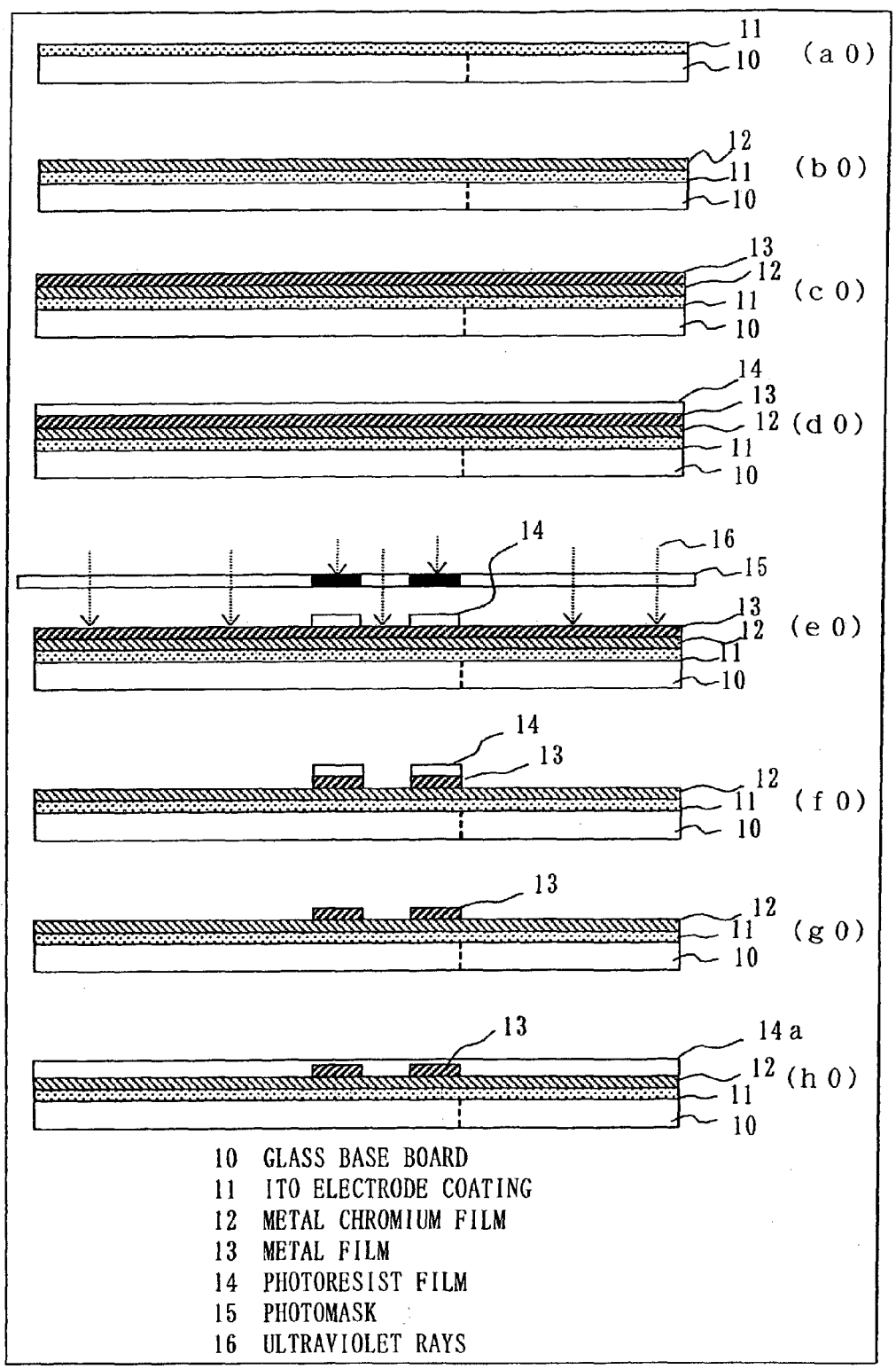
FIG. 9 illustrates a method for forming a blocking mask and an electrode pattern of the liquid crystal shutter panel according to the related art.
Figure 10:
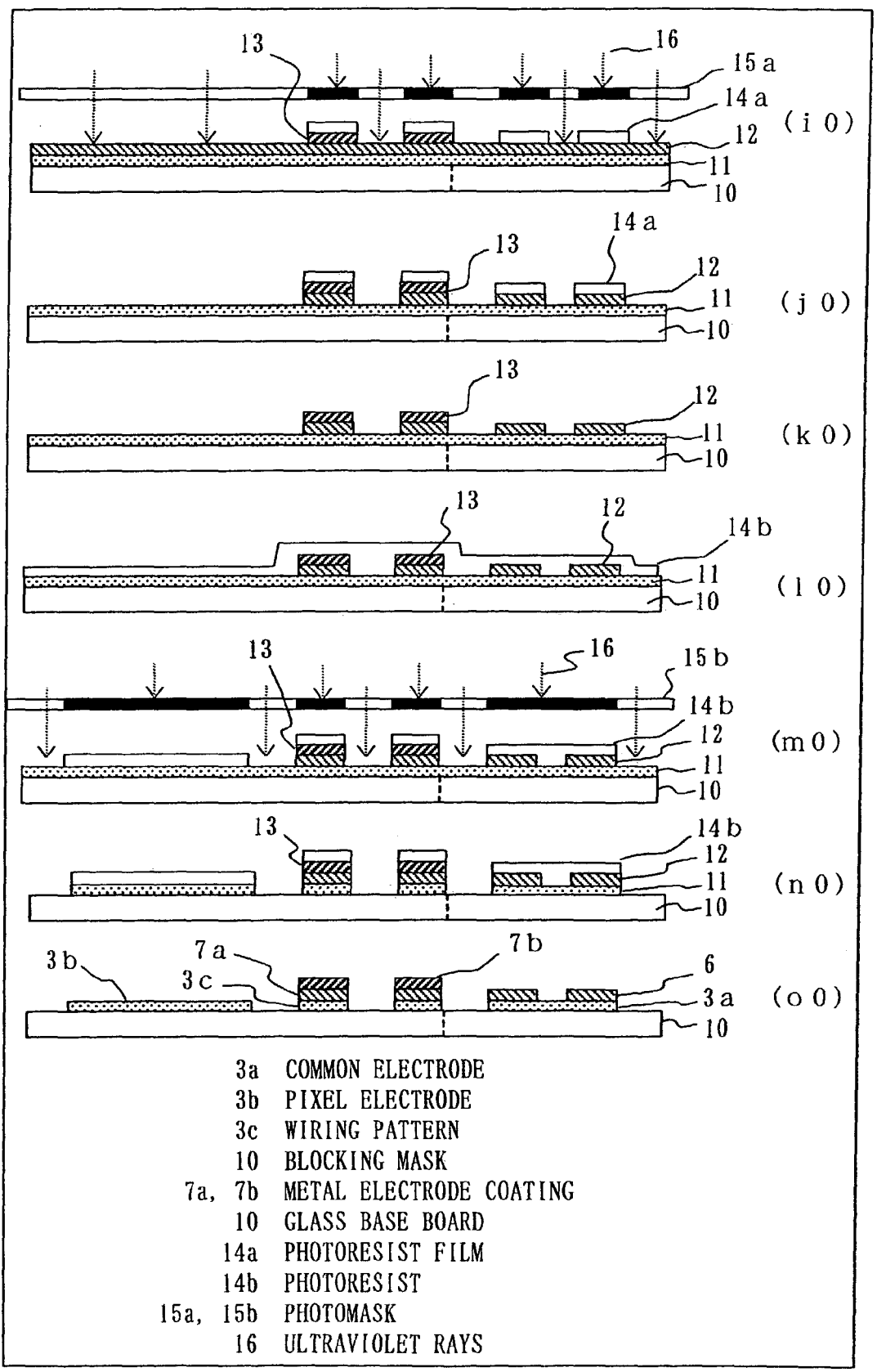
FIG. 10 illustrates a method for forming the blocking mask and the electrode pattern of the liquid crystal shutter panel according to the related art.

With reference to FIGS. 5A, 5B and 6, Embodiment 3 of this invention is explained.

FIG. 5A shows a perspective view illustrating disassembled structure of a printer head in Embodiment 3 using the liquid crystal shutter panel in Embodiment 1 and Embodiment 2. FIG. 5B shows an upper plane view illustrating an upper surface (looking in direction A in FIG. 5A) of the liquid crystal shutter panel in Embodiment 1 and Embodiment 2. FIG. 6 shows a detailed sectional view illustrating a structure of the printer head.

In the printer head, a light source unit 21 including a light source board 20 mounted with a plurality of LED (Light Emitting Diode) 19 which are light sources is arranged to be contacted with or close to a surface (direction of arrow A in FIGS. 5A, 5B and 6) of the upper glass board 1a on which the blocking mask of gold film 6a is formed on a liquid crystal shutter panel 18 illustrated in Embodiment 2.

In FIG. 6, the light source unit 21 includes a light conductive material 23 for conducting the light from the LED 19 to an opening part 26 of the liquid crystal shutter panel 18, and a reflection cover 24 made of a member with a high light reflection rate for covering the light conductive material 23. The reflection cover 24 is open in the direction of arrow A to form an opening for shooting the light.

In FIG. 6, twisted nematic liquid crystal (TN liquid crystal) 5a is illustrated, and the liquid crystal shutter panel 18 is a display panel of TN type. Polarization plates 22a and 22b are also illustrated. The polarization plate 22a is placed on the upper glass board 1a, and the polarization plate 22b is placed on the lower glass board 1b. The polarization plates 22a and 22b are arranged to be orthogonal each other. The liquid crystal shutter panel 18 is structured for a positive (normally white) display. Since other structure is same as Embodiment 1, explanations are omitted here.

Next, action of the light emitted from the LED 19 is explained. The light emitted from the LED 19 propagates in the light conductive material 23. Among the light propagating in the light conductive material 23, the light which has hit a light spreading layer 25 spreads. Among the light which has spread, the light which has spread in the direction A in FIGS. 5A, 5B and 6 and has been shot to an outside of the light conductive material 23 is divided into incident light to the opening part 26 on the liquid crystal shutter panel 18 and light blocked by the blocking mask of gold film 6a. The light which has spread in directions other than direction A is reflected by the reflection cover 24, and returned to the light conductive material 23. Among the light which has spread in direction A in FIGS. 5A, 5B and 6, the light blocked by the blocking mask of gold film 6a is reflected by the blocking mask of gold film 6a made of the gold film which has higher reflection rate than the chromium metal, and returned to the light conductive material 23.

The incident light to the opening part 26 on the liquid crystal shutter panel 18 is controlled by ON/OFF controlling the pixel electrode 3b through the drive IC 8 based on image data input from the cable 9 for signal. Accordingly, a light amount for irradiating a photosensitive recording medium 27 is controlled. By moving the optical printer head including the liquid crystal shutter panel 18 and the light source unit 21 and the photosensitive recording medium 27 relatively, an image is formed on the photosensitive recording medium 27.

The opening part 26 corresponds to a pixel formed by the printer head, and the blocking mask of gold film 6a has a function of preventing the leakage of the light from an area except the pixel.

The reflection cover 24 is a mechanism for reflecting the light in this invention.

As stated, by using the liquid crystal shutter panel 18 including the blocking mask of gold film 6a made of the gold film in film thickness of 0.28 μm (micrometer) or more as illustrated in Embodiment 1 and Embodiment 2, the optical printer head which can prevent the leakage of the light from an area except the opening part 26 (the area except the pixel) can be structured at low costs.

Further, since the surface of the upper glass board 1a on which the blocking mask of gold film 6a is formed is structured to contact with the opening for shooting the light of the light source unit 21, the light blocked by the blocking mask of gold film 6a which has higher reflection rate than the chromium metal is reflected efficiently, and returned to the light conductive material 23. Therefore, the optical printer head with less loss, which can utilize the light efficiently can be structured.

In the stated embodiments, in the liquid crystal shutter panel 18, the polarization plate 22a and the polarization plate 22b are arranged to be orthogonal each other, and the normally white (positive) display is used. However, a normally black (negative) display in which the polarization plate 22a and the polarization plate 22b are arranged to be parallel each other is also possible. Further, in the stated embodiments, the liquid crystal in TN type made of the twisted nematic liquid crystal 5a is used. However, a type of the liquid crystal is not limited to this type. For example, a panel of STN (super twisted nematic) type made of super twisted nematic liquid crystal can be used. In this case, the polarization plate 22a and the polarization plate 22b can be arranged adaptively based on a mode (blue mode or yellow mode) used in the panel of STN type.

In the stated embodiments, an example in which the light travels from the upper glass board 1a to the lower glass board 1b has been illustrated. However, it is also possible that the light travels from the lower glass board 1b to the upper glass board 1a in a reverse way. In this case, among the light reflected by the blocking mask of gold film 6a, a light amount returned to the light source unit 21 is less than the stated embodiments. Hence, the efficiency in utilizing the light drops.

According to this invention, the liquid crystal shutter panel which has sufficient blocking effect can be realized.

According to this invention, the optical printer head which can utilize the light efficiently can be realized.

According to this invention, the blocking mask and the electrode coating are formed together. Therefore, it is possible to reduce the steps for manufacturing the liquid crystal shutter panel.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A liquid crystal shutter panel including a plurality of pixels for one of transmitting and blocking light based on an input signal from an outside, comprising:
    an upper glass board;
    a lower glass board;
    a liquid crystal driven based on the input signal;
    a blocking mask for preventing leakage of light from an area except the pixels, wherein the blocking mask is a gold film paste; and
    an upper polarization plate positioned on the upper glass board; and
    a lower polarization plate positioned on the lower glass board.

2. A liquid crystal shutter panel comprising:
    a pixel electrode board which transmits light, on a surface of which a pixel electrode to which an image data signal is supplied is formed;
    a common electrode board made of a same material with the pixel electrode board, arranged to be parallel with the pixel electrode board, on a surface of which, facing the pixel electrode, a common electrode is formed;
    a blocking mask, which is a gold film paste, formed on the common electrode, including an opening part for transmitting light which has been transmitted by one of the pixel electrode board and the common electrode board and is emitted toward the other one of them; and
    liquid crystal arranged between the pixel electrode and the blocking mask, which is driven based on the image data signal,
    an upper polarization plate positioned on the common electrode board; and
    a lower polarization plate positioned on the pixel electrode board.

3. The liquid crystal shutter panel of claim 2, further comprising:
    a wiring pattern formed on the pixel electrode board, for connecting the pixel electrode and the common electrode; and
    an electrode coating made of the gold film, which is formed on the wiring pattern.

4. The liquid crystal shutter panel of claim 3, wherein the pixel electrode, the common electrode, and the wiring pattern are formed using a same material.

5. An optical printer head comprising:
    a liquid crystal shutter panel including;
    a pixel electrode board, formed on the lower glass board, which transmits light, on a surface of which a pixel electrode to which an image data signal is supplied is formed;
    a common electrode board, formed on the upper glass board, made of a same material with the pixel electrode board, arranged to be parallel with the pixel electrode board, on a surface of which, facing the pixel electrode, a common electrode is formed;
    a blocking mask, which is a gold film paste, formed on the common electrode, including an opening part for transmitting light which has been transmitted by one of the pixel electrode board and the common electrode board and is emitted toward the other one of them;
    an upper polarization plate formed on the common electrode board; and
    a lower polarization plate formed on the pixel electrode board; and
    a light source unit, wherein the light source unit includes a light source and an opening for shooting light and irradiates the liquid crystal shutter with light emitted from the light source through the opening for shooting light.

6. The optical printer head of claim 5, wherein the light source unit further includes a light reflecting mechanism for reflecting the light emitted from the light source and light entered the light source unit through the opening for shooting light.

7. The optical printer head of claim 5, wherein the light source unit is arranged on a side of the common electrode board of the liquid crystal shutter panel.

8. A method for manufacturing a liquid crystal shutter panel comprising:
    forming a pixel from a base material electrode on a pixel electrode board, the pixel electrode receiving an image data signal, forming a common electrode from the base material on a common electrode board which is located parallel and opposite the pixel electrode board;
    forming a wiring pattern on the pixel electrode board for connecting the pixel electrode board and the common electrode board;

forming a blocking mask at a position corresponding to the common electrode on the common electrode board; and forming an electrode coating at a position corresponding to the wiring pattern on the pixel electrode boards the blocking mask and electrode coating being formed by printing an organic gold paste at the position corresponding to the common electrode and wiring pattern and baking the printed organic gold paste to produce a gold film which forms the blocking mask and electrode coating.

9. The method for manufacturing the liquid crystal shutter panel of claim 8, further comprising:

producing a cell by combining the common electrode board and the pixel electrode board by a seal material so that the common electrode and the pixel electrode face each other after the electrode forming.

10. The method for manufacturing the liquid crystal shutter panel of claim 8, wherein a thickness of the gold film of the blocking mask produced in the gold film producing is 0.28 micrometer or more.

* * * * *